US005461510A

United States Patent [19]

Vilnes

[11] Patent Number: 5,461,510

[45] Date of Patent: Oct. 24, 1995

[54] METHOD FOR ASSEMBLING OR DISASSEMBLING OF MODULES IN A PANEL STRUCTURE TOGETHER WITH A PANEL STRUCTURE IN WHICH THE METHOD IS APPLIED

[76] Inventor: Dag Vilnes, Kleivveien 16, N-3132 Husøysund, Norway

[21] Appl. No.: 284,419

[22] PCT Filed: Feb. 5, 1993

[86] PCT No.: PCT/NO93/00022

§ 371 Date: Aug. 2, 1994

§ 102(e) Date: Aug. 2, 1994

[87] PCT Pub. No.: WO93/16578

PCT Pub. Date: Aug. 19, 1993

[30] Foreign Application Priority Data

Feb. 7, 1992 [NO] Norway .................................... 920498

[51] Int. Cl.$^6$ .................................................. G03B 21/56

[52] U.S. Cl. ........................................... 359/449; 348/840

[58] Field of Search .................................... 359/449, 443; 395/153; 361/680, 681, 731; 348/840; 353/94

[56] References Cited

U.S. PATENT DOCUMENTS

| | | | |
|---|---|---|---|
| 4,649,432 | 3/1987 | Watanabe et al. | 358/241 |
| 4,866,530 | 9/1989 | Kalua | 358/237 |
| 5,079,636 | 1/1992 | Brody | 358/241 |
| 5,103,339 | 4/1992 | Broome | 359/443 |
| 5,116,117 | 5/1992 | Miyashita | 353/94 |
| 5,206,760 | 4/1993 | Nakashima et al. | 359/457 |
| 5,317,449 | 5/1994 | Furuno et al. | 359/443 |
| 5,400,178 | 3/1995 | Yamada et al. | 359/449 |

*Primary Examiner*—Richard A. Wintercorn
*Attorney, Agent, or Firm*—Iver P. Cooper

[57] ABSTRACT

A method for installing or removing modules of elements in a panel structure, especially for installing display modules in a large screen, the modules are mounted in a lattice formed by orthogonally crossing chords which can be moved in a horizontal and vertical direction in a frame structure in which the chords are fitted. A panel structure wherein the method is used, consists of a lattice of orthogonally crossing chords fitted in a frame structure in which a carrier device consisting of movable sections is arranged to give the chords a horizontal or vertical displacement.

14 Claims, 8 Drawing Sheets

METHOD FOR ASSEMBLING OR DISASSEMBLING OF MODULES IN A PANEL STRUCTURE TOGETHER WITH A PANEL STRUCTURE IN WHICH THE METHOD IS APPLIED

The invention concerns a method for assembling modules or elements in a panel structure, especially for assembling of display modules in a large screen according to the introduction of claim 1. The invention also concerns a device for assembling of modules or elements in a panel structure, especially for assembling of display modules in a large screen according to the introduction of claim 7.

Typical examples of panel structures of the kind described in the introduction are large screens for displaying television broadcasts or video film, where the large screen is composed of a number of display modules, each of which shows a section of the television or video picture. Each individual module therefore constitutes an independent television or video receiver and can be based on, for example, cathode ray tubes or large LCD modules. The panel structure according to the present invention may, however, also be in the form of large screens of a different kind, e.g. module-based light panels for advertising and information purposes or module-based solar panels which are linked together. In the case of such module-based panel structures, where the individual modules have some kind of electrical connection, there will be a frequent need to replace individual modules, e.g. for maintenance or repair of faults. The replacement should preferably be able to be performed while the panel structure, i.e. e.g. the large screen, is in operation, and without the necessity of disconnecting or removing other modules which do not require to be replaced. This means that assembling and disassambling of the modules should preferably be able to be performed from the back of the panel structure or screen.

From prior art there are known panel structures composed of modules, where the panel structure's supporting element is designed as a rigid, e.g., rectangular frame and the individual modules are fitted in the frame, a lattice-like device, which is secured in the frame, being used for this purpose. In this connection assembling or disassembling of the modules usually has to be performed from the front of the frame and often involves a considerable amount of work, which again results in the assembly and disassembly work becoming both time-consuming and expensive.

An additional factor is that, in order to support the weight of the display modules while simultaneously permitting the assembling and disassembling, the frame and lattice are designed with dimensions which cause the weight of the panel structure over and above the weight of the modules to become very great. Attempts have been made to avoid this by designing the lattice in the form of orthogonally crossing chords or wires which are under tension and permanently secured to the sides of the frame.

Finally the weight of the above-lying on the below-lying modules constitutes a problem with module-based panel structures or large screens of this type. Thus all prior art solutions for module-based large screens are both extremely heavy and present complications when replacing individual modules.

The object of the present invention is therefore to mitigate and eliminate the above-mentioned problems with prior art module-based panel structures for, e.g., large screens.

A further object is to provide a module-based panel structure which has as low a weight as possible and where the weight of the above-lying modules does not place a strain on the below-lying modules. Yet another object is that the modules should be able to be simply and easily replaced separately from the back, even while the panel structure is in use or the large screen in operation. A further object is to provide a panel structure wherein the mechanical loading on the individual modules is independent of the location of the module in the image surface. Another object of the present invention is to provide a panel structure with a tight fit between the individual modules and without the use of separate frames for each individual module in order to achieve such a fit. The last object will be of vital importance when the panel structure is a module-based large screen which has to be used for the display of a homogeneous image. Last, but not least, an object of the invention is that there should be easy access to the modules of the panel structure from both sides of the panel structure, a feature which will be essential with regard to service and maintenance.

The above-mentioned and other objects of the present invention are provided by a method which is characterized by the features disclosed b claim 1. Further features and advantages of the method are disclosed by the independent claims 2–6. A device where the method according to the invention is applied is characterized by the features disclosed by claim 7. Further features and advantages of the device are disclosed in the independent claims 8–14.

The method and device according to the invention will now be described in more detail in connection with an embodiment of a module-based large screen with reference to the accompanying drawing, on the understanding that the large screen should be regarded purely as an example and should in no way limit the scope of the invention and the development of panel structures of a similar kind.

BRIEF DESCRIPTION OF THE DRAWINGS

FIG. 1 illustrates a large screen according to the present invention. The large screen consists of a first, square frame 1 and a second frame 2 which is arranged in such a way that it overlays the first frame 1. The large screen further comprises a number of square display modules 3 which are inserted in the frames.

From FIG. 2 it can be seen that the second frame 2 is composed of angular sections 2*a*, 2*b*, 2*c*, 2*d* which are provided movably overlaid on the first frame 1. In FIG. 2, moreover, these movable frame sections 2*a*, 2*b*, 2*c*, 2*d* are shown displaced in relation to the first frame 1, the displacement movement for each individual frame section coinciding with the diagonal of the first frame. At the same time the display modules or only the modules 3 are also shown moved in relation to one another, as indicated by the fact that a space is shown between each individual module 3. In this state the individual module 3 can easily be removed from or inserted into the large screen and FIG. 2 thus illustrates the situation when service or maintenance work is performed.

Figure 1:
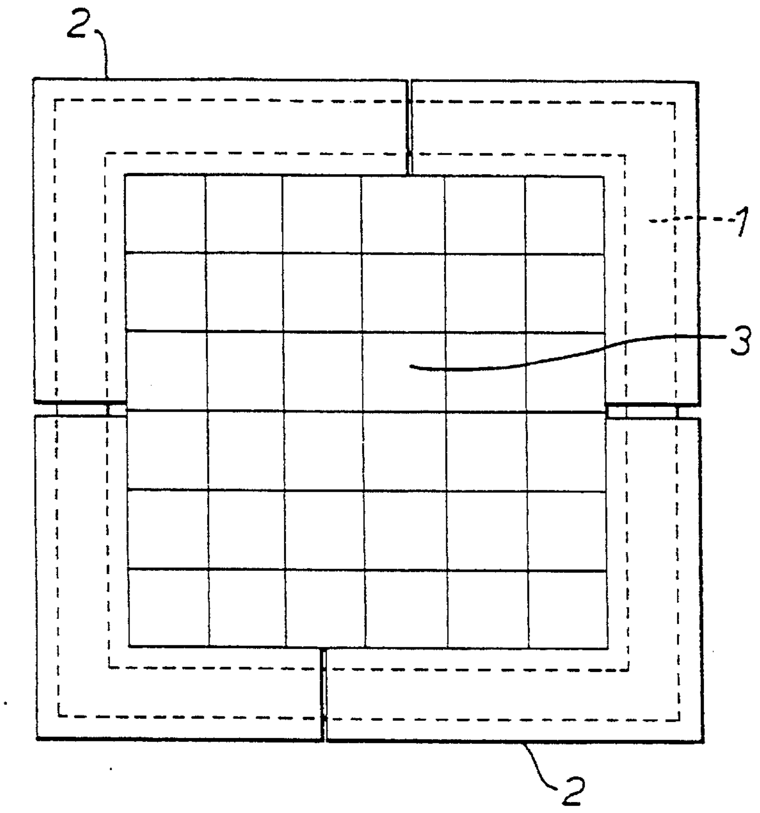
FIG. 1 is a view of a large screen according to the invention as it will appear during use.
Figure 2:
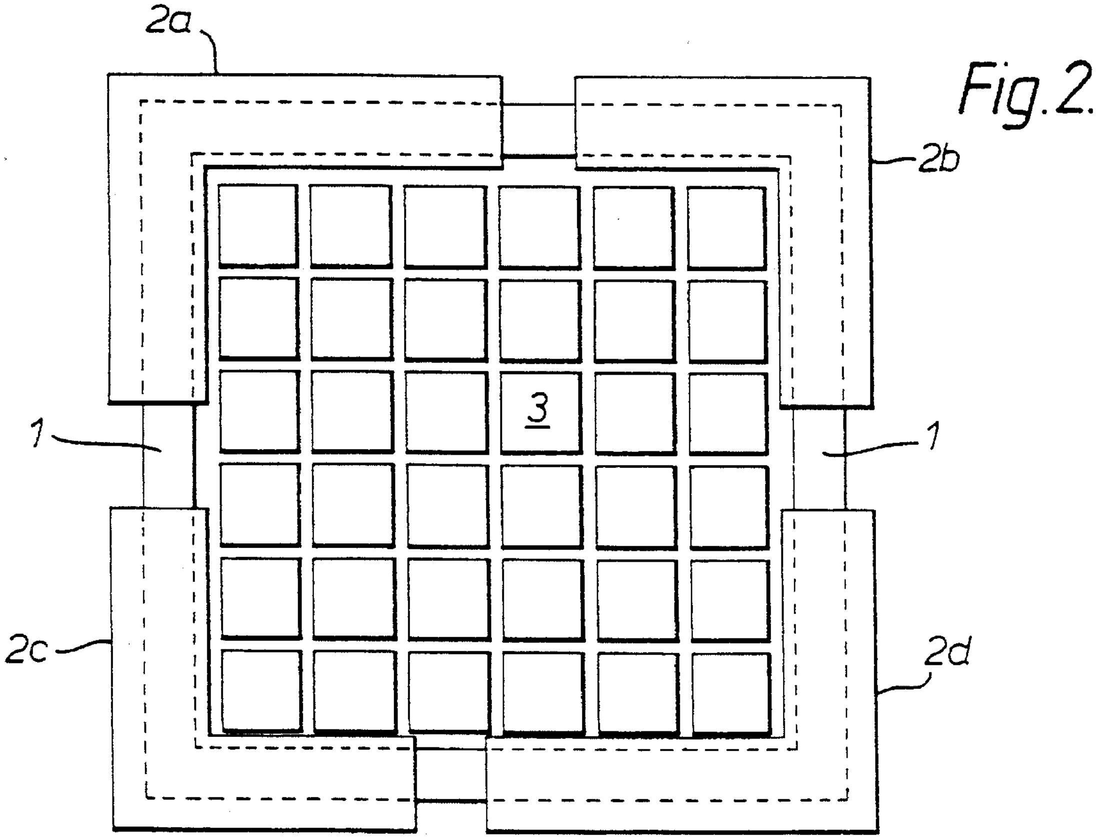
FIG. 2 is a view of the large screen in FIG. 1 during assembly or disassembly of the individual modules.
Figure 3:
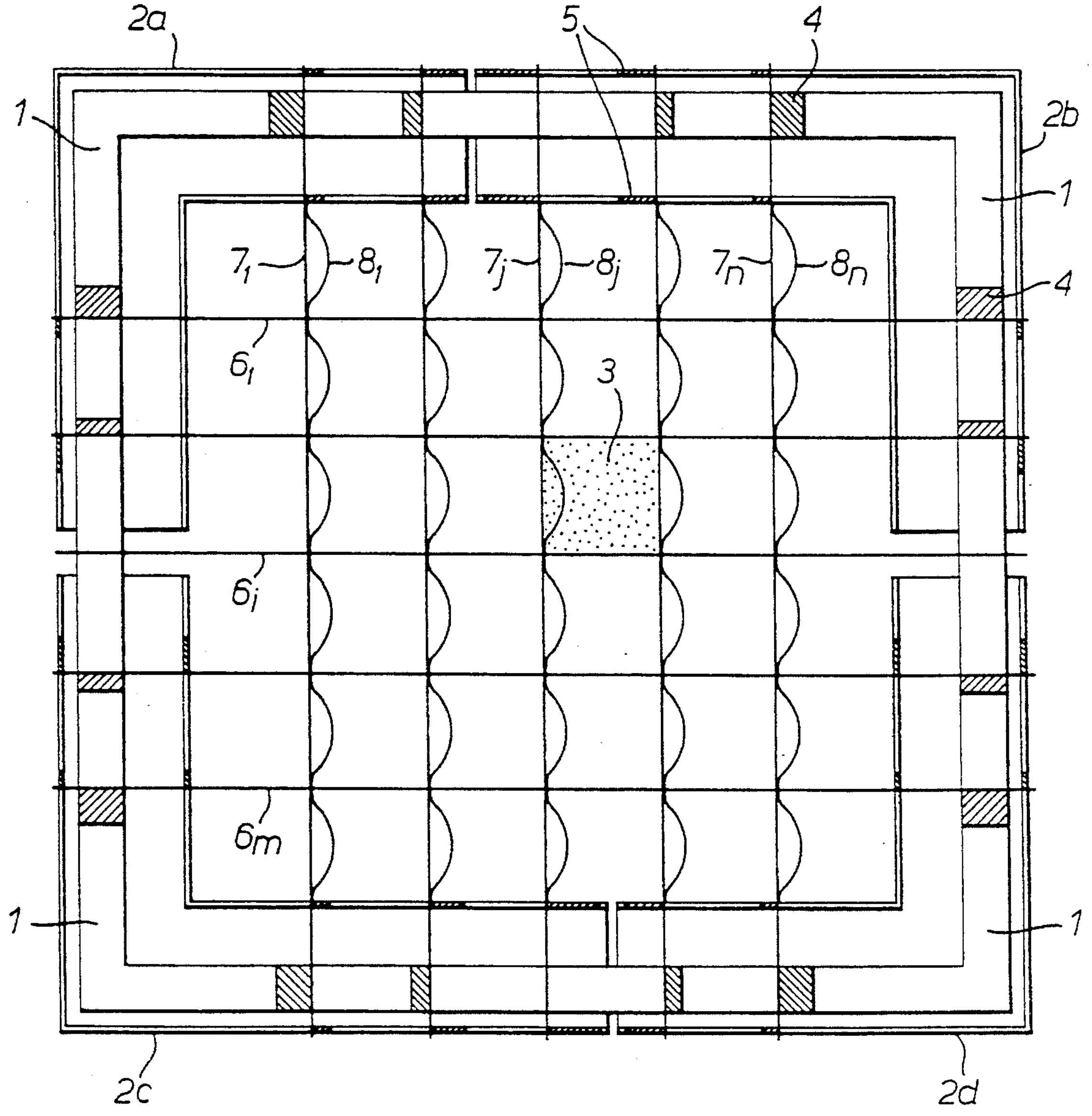
FIG. 3 is a view of the large screen in FIG. 1.

The large screen is illustrated in more detail in FIG. 3. Here, as in the other figures, the first frame is indicated by 1, while the agular sections 2*a*, 2*b*, 2*c*, 2*d* of the second frame 2 overlay the first frame. Further, the large screen is illustrated with one single module 3 inserted in order thereby to clearly represent the lattice composed of a number of horizontal and vertical chords 6, 7 respectively. The horizontal chords are numbered from top to bottom from 1 to m, while the vertical chords are numbered from left to right from 1 to n. The horizontal central chord is indicated by $\mathbf{6}_i$ and the vertical central chord by $\mathbf{7}_j$.

The modules can be mounted in the spaces in the lattice which are formed by the orthogonally crossing horizontal and vertical chords, 6, 7, the square shape and dimensions of the spaces being adapted to the dimensions of the modules 3. When the modules are assembled or disassembled, the individual frame sections 2*a*, 2*b*, 2*c*, 2*d* in the second frame 2 are moved along the respective diagonals in the first frame 1. This means that the displacement movement of an individual frame section in the second frame 2 is composed of two components, viz. a horizontal component $H_s$ and a vertical component $V_s$, the frame sections 2*a* and 2*c* having the horizontal component $H_s$ facing towards the left in FIG. 3 and the vertical component $V_s$ upward or downward respectively, while the horizontal component for the frame sections 2*b* and 2*d* are facing towards the right, but with the same vertical components as for the frame sections 2*a* and 2*c* respectively. The chords 6, 7 in the lattice are now fitted into the frames 1, 2 in such a way that when the sections are moved in the frame 2 they are moved upward or downward respectively in the case of the horizontal chords 6 and to the right or the left in the case of the vertical chords 7. The chords 6, 7 are mounted in the frames 1, 2 in such a way that the frame sections 2*a*, 2*b*, 2*c*, 2*d* act as carriers for the chords and this is achieved precisely during the said displacement in the diagonal directions of each of the sections in the frame 2. There is no displacement movement in the central horizontal chord $\mathbf{6}_i$ and the vertical chord $\mathbf{7}_j$ respectively, while the displacement distance increases with the distance of the chords from these central chords $\mathbf{6}_i$, $\mathbf{7}_j$. The displacement distance for a chord is therefore minimal or zero for these central chords, while it is at a maximum for the horizontal or vertical chords which are located closest to the sides of the frame 1. Such a displacement movement performed by the carrying, movable frame sections 2*a*, 2*b*, 2*c*, 2*d* is achieved by the fact that the central chords $\mathbf{6}_i$, $\mathbf{7}_j$ are passed through oblong openings 4 in the first frame 1 and mounted movably on the outside of this frame. In the middle of the frame 1, i.e. for the central chords $\mathbf{6}_i$, $\mathbf{7}_j$, the openings have a length which does not permit any movement, while the next openings 4 on each side of the central opening have a length which corresponds to the desired displacement distance of the chords and which for the opening through which the chords $\mathbf{6}_i$, $\mathbf{6}_n$, $\mathbf{7}_j$, $\mathbf{7}_n$ at the ends of the frame 1 are passed, have a length which corresponds to the maximum displacement distance. Similarly, the chords are movably passed through long openings 5 in the second frame, these openings having a length which is inversely proportional to the corresponding openings 4 arranged in a line in the frame 1. When the edge of the openings 5 in the frame 2 then engages with the chords 6, 7 or the chords' securing device which is passed through the openings 4, 5, the chords 6, 7 thereby achieve the desired displacement movement.

Figure 4:
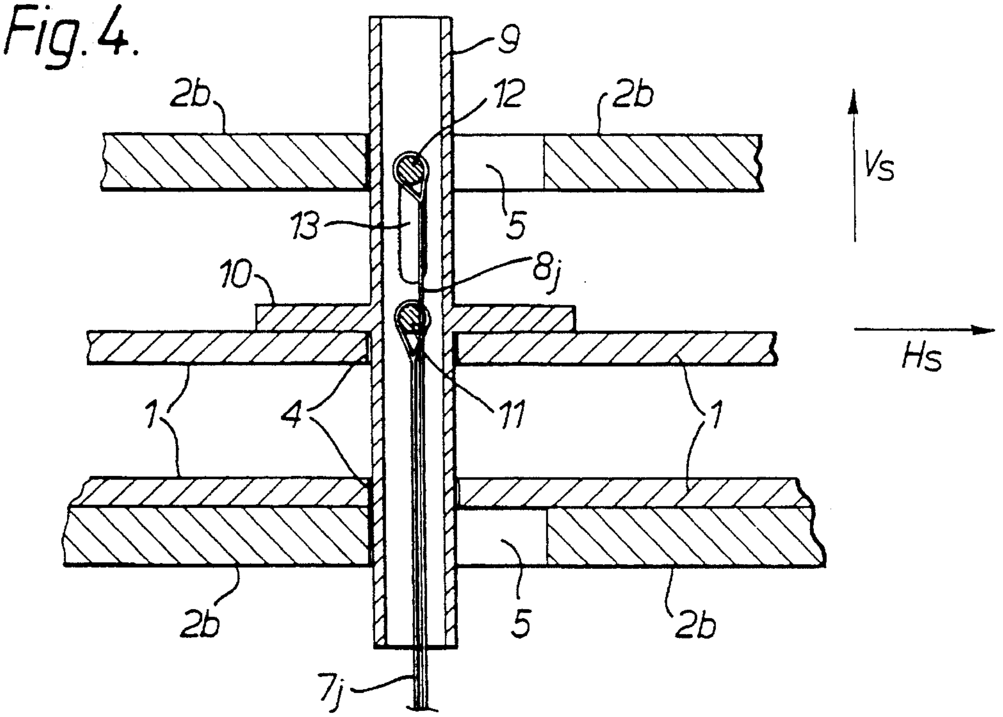
FIG. 4 shows a detail of the frame structure of the large screen in FIG. 1.
Figure 5:
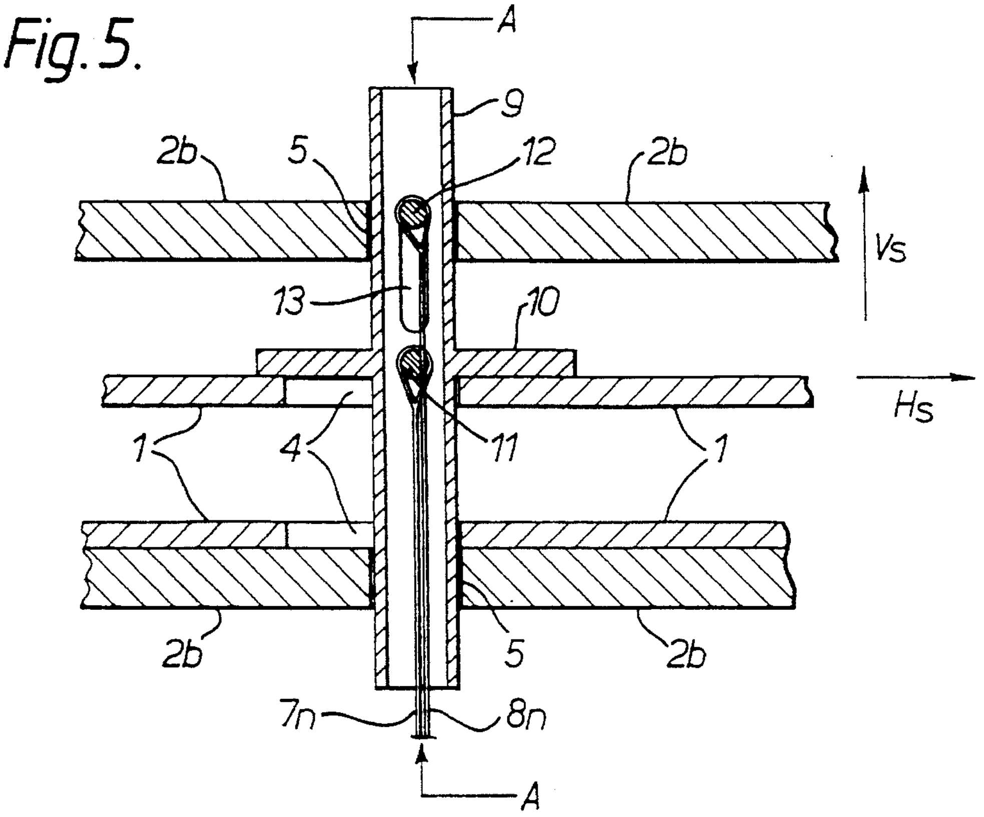
FIG. 5 shows a further aspect of the details of the frame structure illustrated in FIG. 4.

An example of the securing of the chords 6, 7 is shown in the detailed illustration in FIGS. 4 and 5, where FIG. 4, for example, illustrates the arrangement of the vertical central chord $\mathbf{7}_j$ in the first frame 1 and in the frame section 2*b* of the second frame 2, while FIG. 5 illustrates the arrangement of the vertical chord $\mathbf{7}_n$ furthest to the right and closest to the right side of the frame 1 in FIG. 3, in the frame 1 and the frame section 2*b* of the frame 2. In FIG. 4 the central chord $\mathbf{7}_j$ is installed in a sleeve 9 which is passed through the openings 4 and 5 in the first frame 1 and the frame section 2*b* respectively. The sleeve 9 is mounted on the top of the frame 1 by means of a flange 10 which is permanently connected with the sleeve 9 and which abuts against the frame 1. Since the frame 1 can be designed as a square channel or section beam, this means that the sleeve flange 10 rests on the top of the top flange in the frame beam which constitutes the frame 1. The sleeve 9 is passed through the openings 4 in the frame 1 and consequently cannot be moved in the horizontal direction $H_s$ indicated by the arrow. The frame section 2*b* is illustrated extended upward by a distance corresponding to the maximum vertical displacement movement indicated by arrow $V_s$ in FIG. 4. Since the sleeve 9 can slide freely in the openings 5 in the frame section 2*b*, this vertical movement of the frame section 2*b* does not transfer a corresponding movement to the sleeve 9 and thereby the chord $\mathbf{7}_j$ which is tightly stretched by means of the abutment of the sleeve 9 above the flange 10 against the frame 1. By giving the frame section 2*b* a displacement $H_s$ towards the right, the frame section 2*b* will arrive in the position which is illustrated in FIG. 4 and not transfer this displacement to the sleeve 9 due to the fact that the opening 5 has the same dimensions as the maximum displacement length.

FIG. 5 illustrates the corresponding situation for the vertical chord $\mathbf{7}_n$ which is located closest to the right side of the frame 1 and thus should receive the maximum displacement. The sleeve 9 is passed in the frame section 2*b* through the opening 5, which is the same size as the diameter of the sleeve 9. Thus in this case a displacement of the frame section 2*b* towards the right will cause engagement with the sleeve 9 and move it to the right in arrow direction $H_s$ in movable abutment of the sleeve 9 against the flange 10 on the top of the frame 1. In FIG. 5 the vertical chord $\mathbf{7}_n$ and the frame section 2*b* are shown in the final position of the maximum displacement movement and it will be seen that the engagement of the frame section 2*b* at the openings 5 with the sleeve 9 will give the sleeve 9 and thereby the chord $\mathbf{7}_n$ the desired displacement movement through the openings 4 in the frame 1, the length of the openings 4 in the frame 1 corresponding to the maximum displacement movement and thereby also to the length of the openings 5 in the frame section 2*b* in FIG. 4, which illustrates the arrangement of the central chord $\mathbf{7}_j$. Thus it will be realized that the openings 4, 5 arranged in pairs in a line in the first frame 1 and the second frame 2 respectively have lengths which are inversely proportional and which reflect the desired displacement distances.

Figure 6:
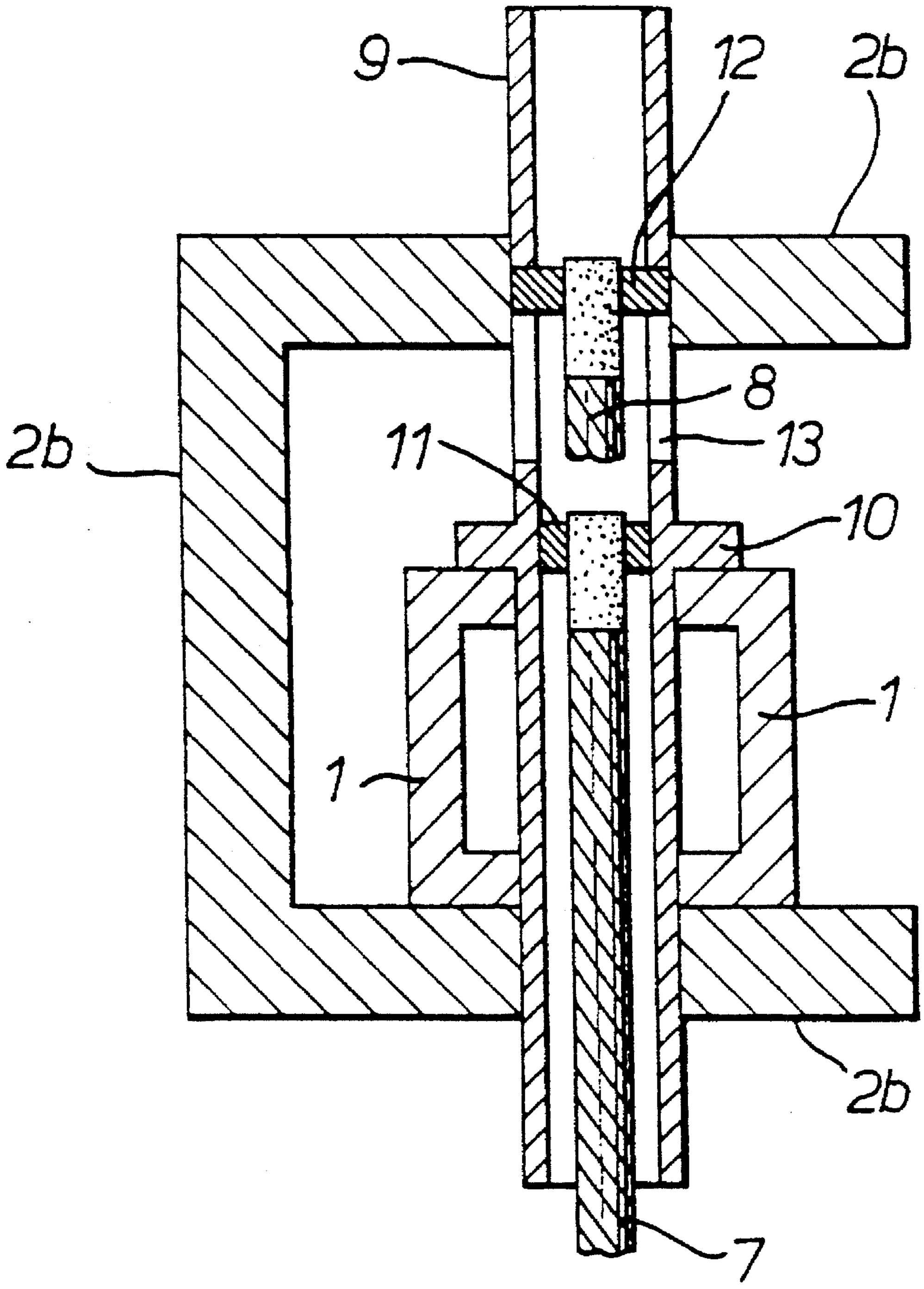
FIG. 6 shows a cross section viewed along line A—A in FIG. 5.

The arrangement of the chords 6, 7 in the frames 1 and 2 are also illustrated in detail in a section taken along A—A in FIG. 5, where it will be seen that the frame section 2*b* is designed as a U-form section beam, i.e. a U-beam, while the first frame 1 is in the form of a square channel beam. The chord 7 may, e.g., be fitted in the sleeve 9 by being mounted on a bolt 11 inside the sleeve and provided on a level with the flange 10 and permanently connected with the sleeve 9. In FIGS. 4, 5 and 6 an additional chord can also be seen which is inserted in the sleeve 9 parallel with the chord 7 and attached to a cross bolt in the upper opening 5 on the frame section 2_b_, this cross bolt being passed through a corresponding extended track 13 provided in the sleeve's longitudinal direction. These chords 8 serve to relieve the strain on the horizontal chords 6 during the vertical movement $V_s$ of the frame sections 2_a_, 2_b_, 2_c_, 2_d_, the relief chords 8 being permanently connected with the horizontal chords 6. If, e.g., as illustrated in FIG. 5, the frame section 2_b_ is moved upward, the relief chords 8 will thus be involved, while the mounting bolt 12 can slide freely in the track 13 on the sleeve. In the case of maximum movement, i.e. in this case cessation of the vertical displacement movement, the relief chords 8, which are slack when the frame sections in the second frame 2 are pushed in, will be taut and stretched by the mounting bolt 12. Thus they contribute to the relief of any strain on the horizontal chords 6, since in the case of maximum extension of the sections in the second frame 2 these chords 6 would otherwise have to support the entire weight of the now separated modules 3. Thus by means of the relief chords 8 the weight of the modules is at least partially transferred to the frame sections 2_a_ and 2_b_, while the relief chords 8 naturally are tensioned by each of the frame sections in the second frame 2.

Figure 7:
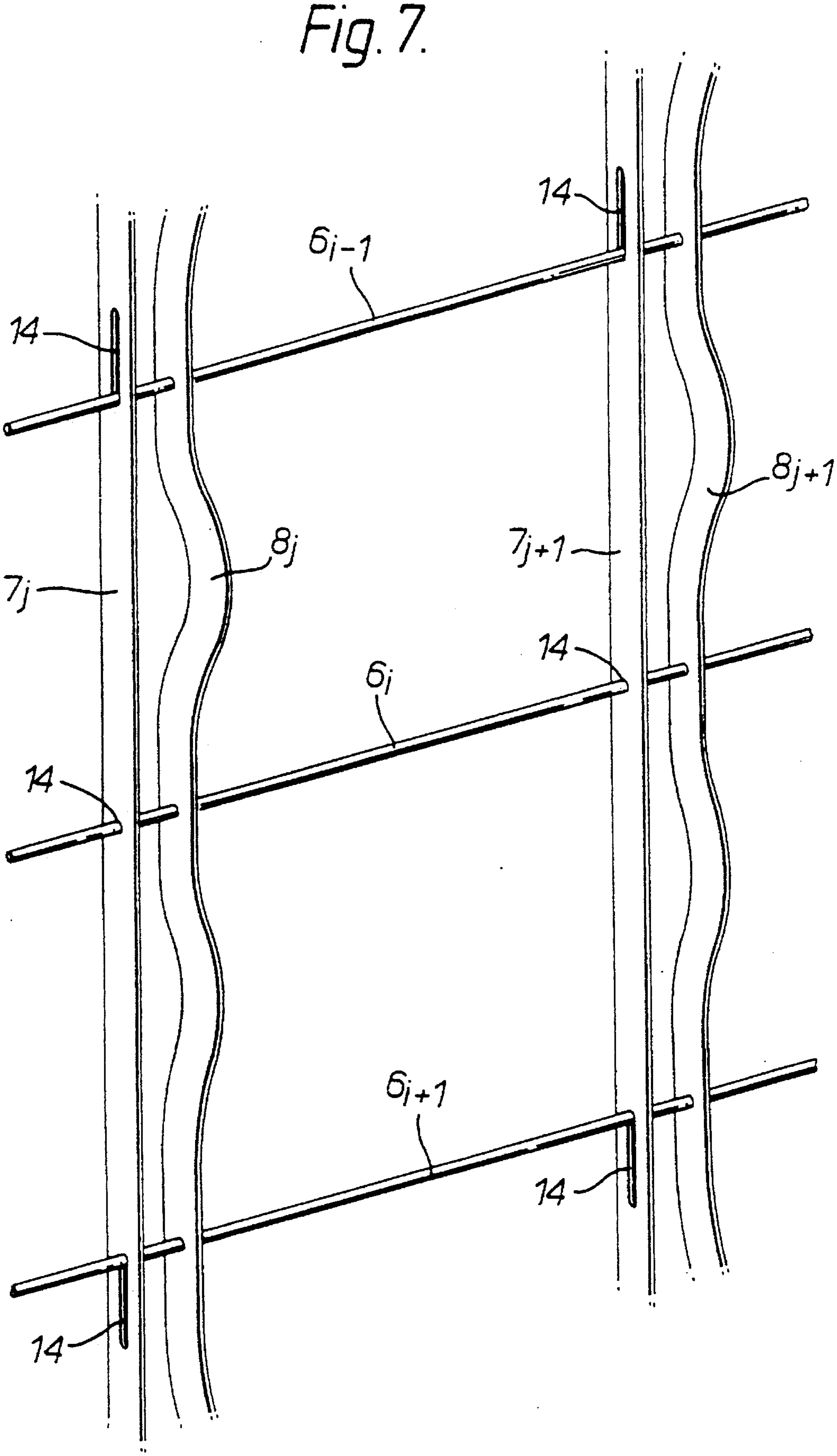
FIG. 7 shows a section of a lattice used in the large screen in FIG. 1.
Figure 8:
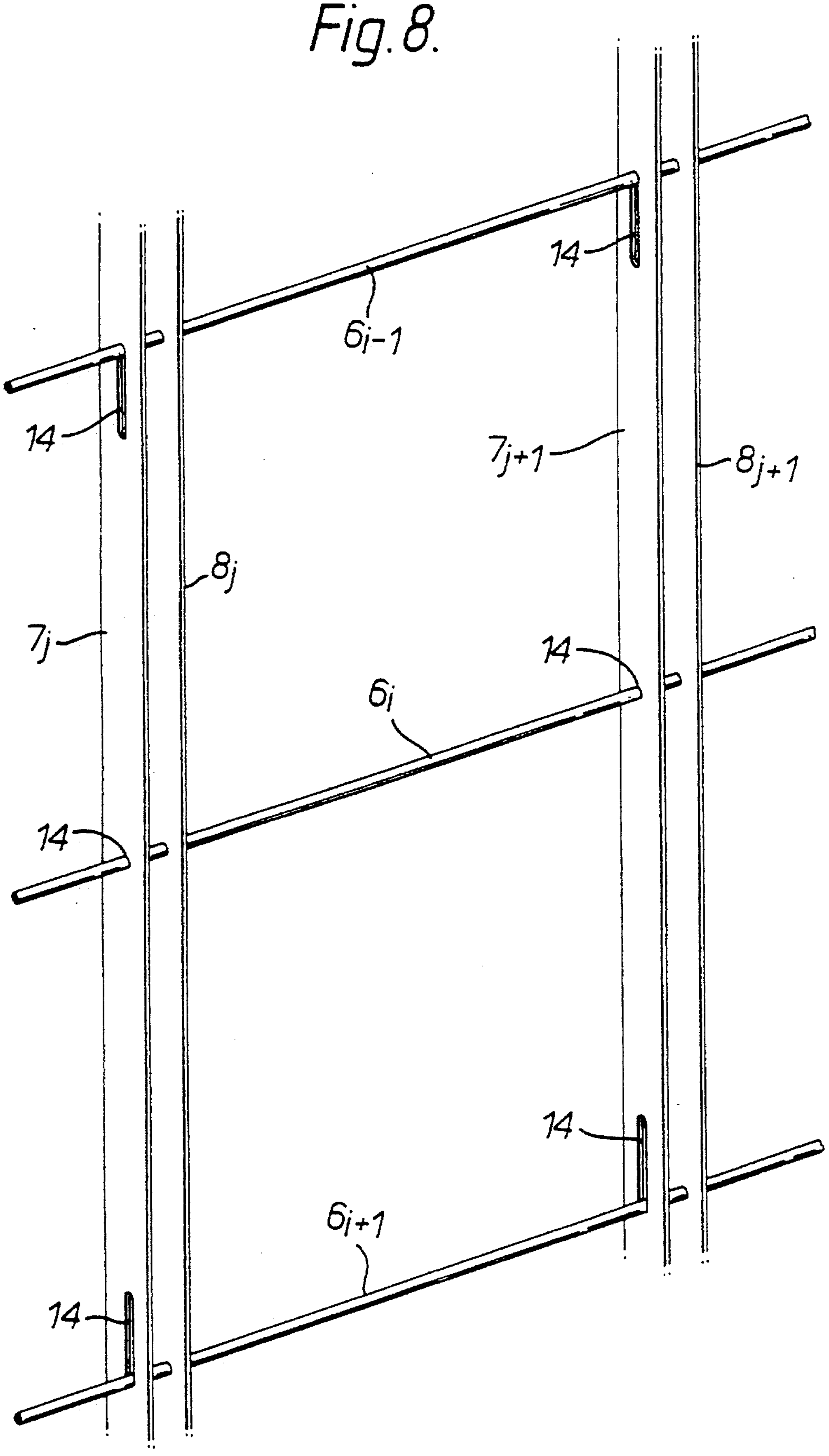
FIG. 8 is another aspect of the lattice in FIG. 7.

The arrangement of the horizontal chords 6 and the vertical chords 7 together with the relief chords 8 in the lattice are better illustrated in FIGS. 7 and 8. In FIG. 7 the horizontal chords 6 are shown in the form of wires, FIG. 7 illustrating the horizontal central chord $\mathbf{6}_i$ and the adjacent chords $\mathbf{6}_{i-1}$ and $\mathbf{6}_{i+1}$. The wires 6 are passed through openings 14 in the vertical chords 7 which are shown here in the form of strips. The openings 14 have a length which corresponds to the desired maximum displacement movement in the vertical direction of the respective horizontal wires 6. The horizontal central wire $\mathbf{6}_i$ has no displacement movement and the opening 14 has therefore approximately the same dimension as the wire $\mathbf{6}_i$. On the side of the vertical strips 7, which in FIG. 7 are illustrated by the vertical central chord $\mathbf{7}_j$ and the adjacent chord $\mathbf{7}_{j+1}$ respectively on the right side, the vertical relief strips 8 are provided and given numbers corresponding to the vertical strips 7. In FIG. 7 these relief strips 8 are shown in a slack state, i.e. when the frame sections in the second frame 2 are pushed completely together and the screen is consequently in a closed position. It will be understood that in this case the relief strips do not serve to relieve the load on the horizontal wires 6, and the weight of the modules 3 is essentially supported by the actual frame structure. If the frame sections are now moved in the second frame 2 to the maximum extent in the vertical direction $V_s$, the horizontal wires on each side of the horizontal central wire $\mathbf{6}_i$ achieve the desired displacement movement. Since the relief strip 8 as already mentioned is substantially permanently connected with the horizontal wires 6, on account of this displacement movement they will be stretched to maximum tension against the horizontal sides or side of an angle in the respective frame sections 2_a_, 2_b_, 2_c_, 2_d_. Thus they too contribute to relieving the horizontal wires 6 of the weight of the modules 3 which now rests on the wires 6.

It will be obvious to a person skilled in the art that the chords can be fitted in other ways than by the use of the sleeve 9 as illustrated in the above embodiment. Moreover, the mounting of the sleeve 9 can be the reverse of that illustrated in FIGS. 4 and 5, i.e. the sleeve rests in abutment against the flanges in the beam which constitutes the frame section 2_b_ and consequently participates in the vertical movement of the frame section 2_b_ indicated in FIGS. 4 and 5. Since the vertical chord 7 at any rate will not be stretched during this vertical movement, the chord 7 being stretched against the frame 1, the fastening bolt 11 for the chord 7 must be provided permanently connected with the frame 1 while at the same time being permitted to slide in a corresponding track in the sleeve 9, while the relief strip 8 in this case is permanently provided in the sleeve 9 and consequently participates in the vertical movement of the latter when the frame section 2_b_ is moved in the vertical direction $V_s$. Thus it can be seen that in this case too the arrangement of the sleeve will be the reverse of that illustrated in FIGS. 4 and 5. It will be obvious to a person skilled in the art that there are a number of methods whereby both the design of the frame sections in the frame 2_b_ and the securing of the chords in the lattice can be implemented in order to achieve the main object of the invention, viz. to permit a movement of the chords 6, 7 as illustrated in the method according to the present invention. The carrier arrangement as realized by the frame sections 2_a_, 2_b_, 2_c_, 2_d_ can, e.g., be implemented in completely different ways than by the use of a U-profile beam as in the present embodiment.

Figure 9:
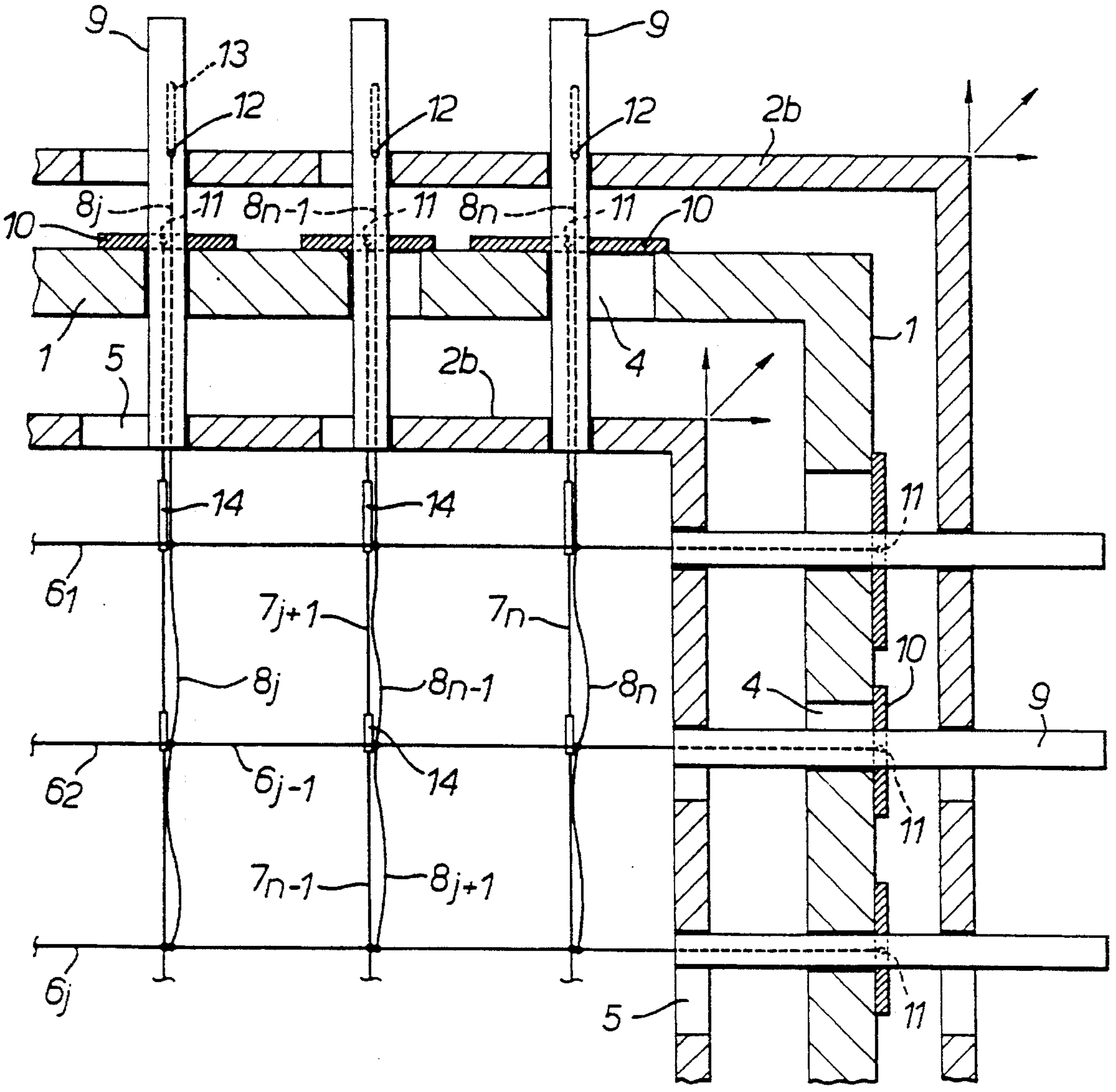
FIG. 9 is a detail corresponding to the upper right quadrant of a large screen in a "closed" state and with room for 2×2 modules.
Figure 10:
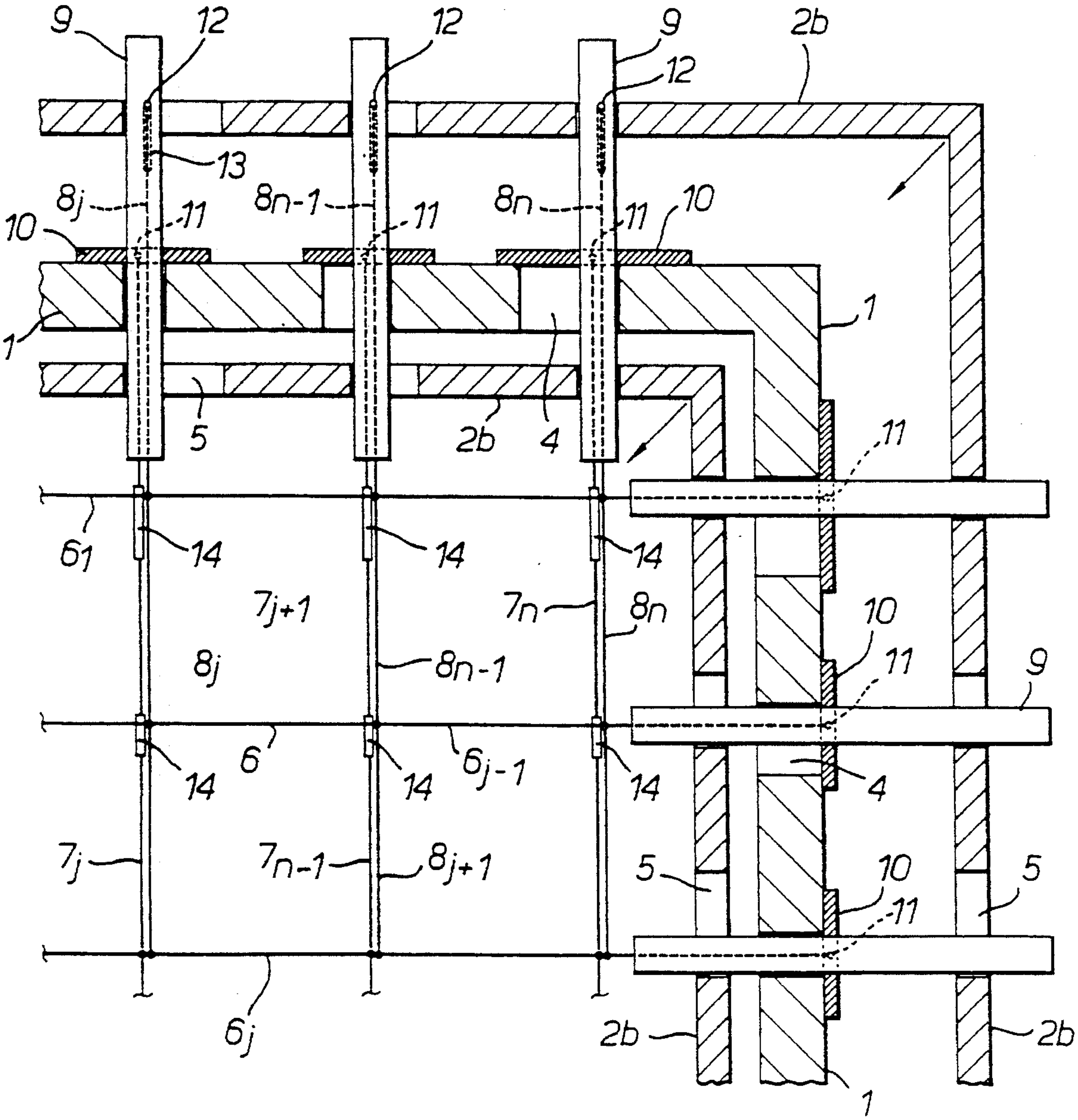
FIG. 10 shows the same detail as in FIG. 9, but with the screen in an "open" state.

The principle involved in the moving of the chords 6, 7 in the lattice is best illustrated schematically in FIGS. 9 and 10 which show a square of the large screen which in this case would contain a total of 16 display modules. The latter are not shown in order to make the details of the structure easier to see. In FIG. 9 the large screen is illustrated in a closed state, as it will appear with the display modules installed, while FIG. 10 illustrates the screen in an open state. In the present case the chords 6, 7 and 8 are fitted in a sleeve-like body which is mounted on the first frame 1 and is therefore moved in the frame section 2_b_. The displacement distances $H_s$ and $V_s$ are illustrated by arrows, as is the resultant of the displacement components.

If the device is designed as a large screen in wide-screen format with the dimensions 16×9 m, four frame sections of approximately 8×4.5 m will be used. When display modules which are 33 cm square are used, there will be three chords per meter in the lattice. If the desired movement is now 5 mm for each display module, it can be seen that each frame section has to be moved in the horizontal and vertical direction respectively by a distance of 8×3×5 mm=120 mm; which will thus become the maximum displacement distance. For large screens of this kind the frame 1 can be designed as the large screen's supporting structure, but this is not necessary and in this case the frame 1 can be provided in another supporting structure, thus limiting its function to the production of the desired displacement movement for the modules 3. It should be noted that the module weight will normally be 4–5 kp, so that in the above examples with 9 modules/$m^2$, there will be 144×9 modules or a total of 1296 modules and a total weight of the modules of approximately 6000 kp. This gives a weight of 40 kp/$m^2$ in the screen, but at the same time it can be seen that the weight load, i.e. the vertical load on the horizontal chords in the open or pushed out state will be approximately 210 kp which is essentially supported by the relief strip and thereby transferred to the frame structure.

It should be understood, however, that the method and the device according to the present invention can also be applied not only in module-based large screens, but in module-based panel structures of a similar kind where there is a requirement for easy assembling or disassembling of the individual modules, while at the same time keeping the weight of the panel structure as low as possible. An example of such panel structures can be large solar panels for solar cell power plants, where the panels are composed of modules of smaller solar panels. Other module-based panel structures, where the modules are mechanically attached and also supplied with electrical connections, will also be capable of being implemented by the device according to the present invention and by the use of the method of the invention for assembling or disassembling of the modules.

I claim:

1. A method for assembling or disassembling of modules (3) or elements in a panel structure, especially for assembling or disassembling of display modules in a large screen, where the large screen comprises a frame structure with a first rectangular frame (1) which defines the format of the panel or the screen, consisting of two horizontal sides and two vertical sides respectively, characterized in that a second frame (2) is provided above the first frame (1), the second frame (2) consisting of a number of adjustable and connected sections (2*a*, 2*b*, 2*c*, 2*d*) which are movable in relation to one another, that a lattice consisting of orthogonal chords (6, 7) is fitted in the second frame's (2) movable sections, a single space in the lattice formed between a pair of respectively horizontal and vertical, orthogonally crossing chords (6, 7) defining the installation point for an individual module (3), in addition that chords (6, 7) are passed through the first frame (1) in movable connection with and to fasten the chords (6, 7) in movable abutment against the first frame (1), so that the chords are stretched by this abutment against the first frame and any load on the chords is entirely supported by the abutment against the first frame, and for assembling or disassembling respectively of the modules (3) in the panel or screen that the horizontal (6) and vertical chords (7) are moved inward or outward respectively parallel to the vertical or horizontal frame sides by moving the individual sections (2*a*, 2*b*, 2*c*, 2*d*) in the second frame (2) in relation to the first frame (1), the respective second frame section acting as a carrier for the fastened chords so that the displacement is least for the chords (6, 7) which pass through the center of the lattice and increases gradually to a maximum displacement value for the chords ($6_i$, $6_m$; $7_i$, $7_n$) which are provided closest to the sides of the first frame (1).

2. A method according to claim 1, characterized in that the chords (6, 7) are passed through oblong openings (4, 5) of varying length in the first and second frame respectively, and that the desired movement is produced by the fact that the length of the openings (4) in the first frame (1) is inversely proportional to the length of the corresponding openings (5) in the second frame (2), the openings in the first frame (1) for the chords ($6_i$, $7_j$) which pass through the center of the lattice having the least length and the corresponding openings in the second frame (2) the greatest length, and the openings in the first frame (1) for the chords ($6_i$, $6_m$; $7_j$, $7_n$) closest to the horizontal and vertical sides having the greatest length and the corresponding openings in the second frame (2) the least length, whereby the gradually increasing displacement of the chords (6, 7) in the lattice from the center of the lattice towards the sides of the frame is provided.

3. A method according to claim 2, characterized in that the ends of the chords (6, 7) are fitted in rigid sleeves (9) which are passed through openings (4, 5) in the first (1) and the second frame (2) respectively for fastening, the sleeves (9) being supplied at a suitable point with a flange (10) which constitutes the string's (6, 7) abutment and stretches it against the first frame (1) or the second frame (2).

4. A method according to claim 2, characterized in that the second frame (2) is equipped with four rectangular sections (2*a*, 2*b*, 2*c*, 2*d*) which are rigidly joined at their respective vertices and with the respective ends of the legs in each section adjustably joined to one another, whereby the horizontal and vertical movement of the chords (6, 7) in the lattice is provided by a movement of the individual angular section (2*a*, 2*b*, 2*c*, 2*d*) along the respective diagonal of the first frame (1).

5. A method according to claim 2, characterized in that wires are used as horizontal chords (6) and strips as vertical chords (7), the wires (6) passing through oblong openings (14) provided in the strips (7), the length of which openings principally corresponds to the vertical displacement movement of the respective wires (6).

6. A method according to claim 5, characterized in that parallel to the strip which constitutes the vertical chords (7) there are provided additional strips (8) which are permanently connected with the horizontal wires (6) and are arranged to be tightened by means of the vertical displacement movement of the horizontal wires (6), these additional strips (8) serving to relieve the load on the horizontal wires when one of the modules (3) is removed and being freely fitted in the sleeve (9) in such a manner that they can perform the said tightening movement.

7. A device for assembling or disassembling of modules or elements in a panel structure, especially for assembling or disassembling of display modules in a large screen, where the large screen comprises a frame structure with a first rectangular frame (1), which defines the format of the panel or screen, consisting of two horizontal sides and two vertical sides respectively, characterized in that above the first frame (1) there is provided a second frame (2), the second frame (2) consisting of a number of adjustable and connected sections (2*a*, 2*b*, 2*c*, 2*d*) which are movable in relation to one another, that in the second frame's movable sections (2*a*, 2*b*, 2*c*, 2*d*) there is fitted a lattice consisting of orthogonal chords (6, 7), a single opening in the lattice formed between a pair of respectively horizontal and vertical, orthogonally crossing chords (6, 7) defining the installation point for an individual module (3), in addition that the chords (6, 7) are passed through the first frame (1) in movable connection with and attached in movable abutment against the first frame (1), so that any load on the chords (6, 7) is entirely supported by the abutment against the first frame, that there are provided openings (4, 5) of varying length in the first and the second frame respectively, the length of the openings (4) in the first frame (1) being inversely proportional to the length of the corresponding openings (5) in the second frame (2) and the chords (6, 7) in the lattice are passed through these openings (4, 5) for fastening in the frames (1, 2), that the openings (4) in the first frame (1) for the chords ($6_i$, $7_j$) which pass through the centre of the lattice have the least length and the corresponding openings in the second frame (2) the greatest length, and that the openings in the first frame (1) for the chords ($6_i$, $6_m$; $7_i$, $7_n$) closest to the horizontal and vertical sides have the greatest length and the corresponding openings in the second frame (2) the least length.

8. A device according to claim 7, characterized in that the ends of the chords (6, 7) are fitted in rigid sleeves (9) which are passed through the holes (4, 5) in the first (1) and the second frame (2) respectively for fastening, the sleeves (9) being supplied at a suitable point with a rigid flange (10) which constitutes the chord's abutment and stretches it against the first frame (1) or the second frame (2).

9. A device according to claim 7, characterized in that the second frame (2) is equipped with four rectangular sections (2*a*, 2*b*, 2*c*, 2*d*) which are rigidly joined at their respective vertices and with the respective ends of the legs in each section adjustably joined to one another in order to permit a simultaneous movement of the individual section (2*a*, 2*b*, 2*c*, 2*d*) along a respective diagonal for the first frame (1).

10. A device according to claim 7, characterized in that the horizontal chords (6) are wires and the vertical chords (7) are strips, the wires (6) passing through oblong openings (14) provided in the strips (7), the length of which openings corresponds to the length of the openings provided in the first frame's vertical end sides for the corresponding wires (6).

11. A device according to one of the preceding claims, characterized in that the first frame (1) is equipped with sides formed by the sides in the channel-shaped hollow beam or channel-like section beam, the opening (4) for attachment of the chords in the lattice being made in each of the beam's flanges, so that pairs of openings (4) arranged in a line are obtained for the attachment of each chord (6, 7) in the first frame.

12. A device according to claim 11, characterized in that the sleeve (9) for attachment of a chord is provided with at least one flange (10) provided on the sleeve (9), thus causing it to abut against a flange in the channel-shaped beam which constitutes the first frame (1).

13. A method according to claim 11, characterized in that the sections (2*a*, 2*b*, 2*c*, 2*d*) in the second frame (2) are designed as channel-shaped sections overlaid the first frame (1) and correspondingly provided with pairs of openings (5) on each of its flanges to permit the chords' (6, 7) sleeves to be passed through, and arranged in line with the corresponding pairs of openings (4) in the first frame (1).

14. A device according claim 1, characterized in that parallel to the strips which constitute the vertical chords (7) there are provided additional strips (8) which are permanently connected with the horizontal wires (6) and are arranged to be tightened by means of the vertical displacement movement of the horizontal wires (6), these additional strips (8) serving to relieve the load on the horizontal wires when one of the modules (3) is removed and being freely fitted in the sleeve (9) in such a manner that they can perform the said tightening movement.

* * * * *